US008281941B2

(12) United States Patent
Fenger

(10) Patent No.: US 8,281,941 B2
(45) Date of Patent: Oct. 9, 2012

(54) HOLDER FOR BOX-SHAPED ARTICLES OF DIFFERENT SIZES

(76) Inventor: Jørgen Holberg Fenger, Lundby (DK)

( * ) Notice: Subject to any disclaimer, the term of this patent is extended or adjusted under 35 U.S.C. 154(b) by 521 days.

(21) Appl. No.: 12/444,438

(22) PCT Filed: Oct. 4, 2007

(86) PCT No.: PCT/DK2007/000425
§ 371 (c)(1),
(2), (4) Date: Jan. 12, 2010

(87) PCT Pub. No.: WO2008/040352
PCT Pub. Date: Apr. 10, 2008

(65) Prior Publication Data
US 2010/0140199 A1  Jun. 10, 2010

(30) Foreign Application Priority Data
Oct. 5, 2006  (DK) .......................... PA 2006 01291

(51) Int. Cl.
*A47G 29/00* (2006.01)
(52) U.S. Cl. ........................................................ 211/40
(58) Field of Classification Search .................... 211/40, 211/94.01, 175, 207, 41.12, 87.01, 88.01; 248/149
See application file for complete search history.

(56) References Cited

U.S. PATENT DOCUMENTS

| | | | | |
|---|---|---|---|---|
| 3,425,568 A * | 2/1969 | Albright | ..................... | 211/87.01 |
| 4,630,732 A * | 12/1986 | Snyman | ........................ | 206/445 |
| 4,805,783 A * | 2/1989 | Mayer | ........................ | 211/94.01 |
| 4,832,195 A * | 5/1989 | Dahl | ........................ | 206/387.15 |
| 5,052,564 A * | 10/1991 | Zuzack | ........................... | 211/40 |
| 5,064,158 A * | 11/1991 | Brazier et al. | ................. | 248/250 |
| 5,105,952 A * | 4/1992 | Krattiger | .......................... | 211/40 |
| 5,148,925 A * | 9/1992 | Althoff et al. | .................... | 211/40 |
| 5,495,953 A * | 3/1996 | Bearth | ............................. | 211/40 |
| 5,572,822 A * | 11/1996 | Lynch et al. | ............... | 40/642.02 |
| 5,667,083 A * | 9/1997 | Schnoor et al. | ............. | 211/41.12 |
| 6,105,794 A * | 8/2000 | Bauer | ......................... | 211/94.01 |
| 6,116,435 A * | 9/2000 | Young | .......................... | 211/94.01 |
| 6,164,467 A * | 12/2000 | DePottey et al. | ............. | 211/189 |
| 6,193,336 B1* | 2/2001 | Jencka | ........................... | 312/9.57 |
| 7,028,851 B1* | 4/2006 | Fenger | ............................ | 211/40 |
| 2002/0139760 A1* | 10/2002 | Davidov | ......................... | 211/40 |
| 2007/0295676 A1* | 12/2007 | Teng | ............................... | 211/40 |

* cited by examiner

*Primary Examiner* — Jennifer E. Novosad
(74) *Attorney, Agent, or Firm* — Browdy and Neimark, PLLC

(57) ABSTRACT

A holder or rack for storing and displaying a plurality of flat box-shaped articles in a substantially vertical and mutual parallel arrangement, comprising at least two mutual parallel and laterally extending rigid beams spaced one above the other in the vertical direction by at least one rigid spacer member, the upper of the beams has a downward extending flange portion providing an upper abutment stop and the lower of the beams has an upward extending flange portion providing a lower abutment stop, each of the beams has on its front side a substantially horizontal and laterally extending projection defining a vertical gap between itself and the other projection, the lower horizontal projection has a substantially smooth and planar horizontal top surface defining a support ledge and the upper horizontal projection has an underside provided with a laterally extending groove adapted to receive and retain an elongated rubber-elastic member having in cross section a wedge-shaped lip portion projecting substantially vertical downwards from the underside of the upper horizontal projection when inserted and retained in the groove so as to form a grip or barb, which holder is characterized in that the at least one rigid spacer member is provided with a member for adjusting the vertical distance between the upper and lower horizontal projections.

18 Claims, 8 Drawing Sheets

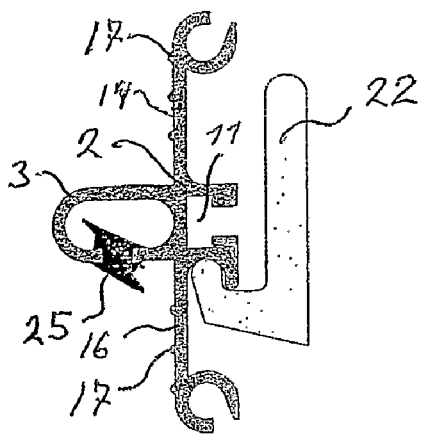
Fig. 7
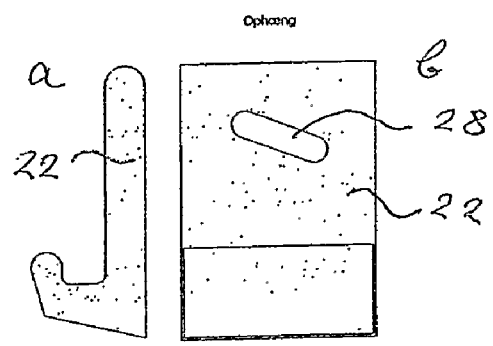
Fig. 8
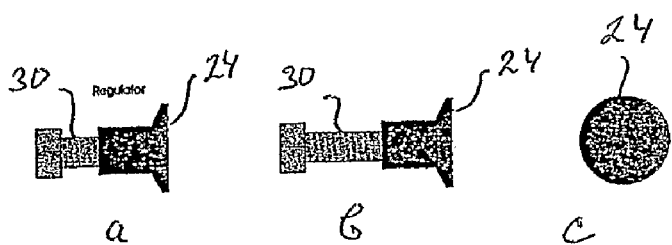
Fig. 9
Fig. 10

HOLDER FOR BOX-SHAPED ARTICLES OF DIFFERENT SIZES

FIELD OF THE INVENTION

The present invention relates to a holder or rack for storing and displaying a plurality of flat box-shaped articles, such as e.g. tiles, cassettes or covers for in particular CDs, DVDs or BLU-RAYs or the like. The articles are typically tall, broad and thin. The invention is in particular appropriate for storage and display of such articles in a substantially vertical and mutual parallel arrangement like books in bookshelves.

BACKGROUND OF THE INVENTION

Digital musical recordings and computer programs are frequently stored on compact discs (CDs). Also digital video discs (DVDs) and MiniDisc-records (compact discs in a small size, MDs) are used for these purposes. Recently it has been decided to produce a new type of permanent digital storage medium called BLU-RAY. All these types of records are, however, generally stored in plastic covers (cassettes) of substantially the same size for each type of medium, but different sizes from medium to medium, i.e. CD, DVD, MD, and BLU-RAY. The covers have retaining means for the records or discs and inner retaining means for insertion of labels or folders.

For the sake of simplicity, all these types of records or discs in their covers are below designated "boxes", and the expressions "box, the box, boxes and the boxes" are to be understood as any of the above stated kinds of flat box-shaped articles.

Holders or racks for such boxes are generally known in exceedingly many variants. One such holder or rack is designed by the designer group TOOLS and produced and marketed by the company Tommy Larsen, Silkeborg, Denmark. It has the form of an extruded (and thus prismatic) item which in a horizontal direction is elongated and has an almost C-shaped cross section. Thus, the two terminal points of the C-shaped cross section form rectilinear, horizontally extending jaws provided with rubber edges facing each other. The holder or rack is intended to be fastened on a wall with the two jaws turning away from the wall and facing the room.

The distance between the two jaws is adapted so that a box just fits tightly in between the rubber edges of the jaws, when set on edge with its back facing the room. The bottom jaw projects somewhat longer out from the wall than the top jaw, whereby the box is retained in a secure way even though it is loaded downwards by the gravitational force or possible impacts.

However, this rack has the drawback that the box is retained relatively tightly between the jaws. This makes it unnecessarily difficult to insert and remove boxes, and, as they are produced from a rather fragile type of plastic, they breaks easily when inserted in or removed from the known rack.

A further inconvenience of the known carrying device is that the box does not have a well-defined orientation in a rotating direction around a horizontal axis parallel to the wall on which the rack is mounted. No well-defined stops being provided for the rear edge of the box and at the same time, the box moves stiffly at insertion, it is difficult for a user to reach a well-defined position for each individual box, and consequently they are not aligned with each other when they are placed in the rack.

Finally, it is a disadvantage of the known rack that when removing a box from the rack, the box can only be seized by the two corners facing the room.

Another rack of the initially stated kind and designed by Frank Nielsen is known from a catalogue "Living Design— Music is the Dream Language of the World" from the company LIVING DESIGN of AM Denmark NS, Kokkedal, Denmark (page 23).

This rack consists of an extruded rail mounted horizontally on a wall or the like. The rail has near its top edge two narrowly spaced, elongated, horizontal jaws of which the top jaw is drawn backwards against the wall and the bottom jaw projects into the room.

Between these two jaws, an inner end of an arm or cantilever can be arranged and in its rest position project horizontally into the room and furthermore swing in a horizontal plane and thus be left in any desired angle with the wall, in the horizontal plane.

The Boxes are each arranged hanging down from one of these arms by hooks on the underside of the arm being engaged with recesses provided on the upper edge of cover of the box in connection with the retaining means for the insertion labels or folder.

Thus, the Boxes may swing sideways forwards and backwards in a way in which a reader may "leaf" through a book. It is easy to watch the fronts of the boxes in order to choose one to be played or entered into the computer.

The boxes with attached arms may probably be detached from the wall rail when they are to be played. If the boxes are transported, it is, however, usually necessary to demount the arms.

It is a drawback of this rack that the boxes are not particularly close in the sideways direction. It is obviously necessary with a considerably mutual horizontal distance between the boxes for them to be able to swing sufficiently widely. The rack has thus a considerably reduced storage capacity per occupied cubic unit in relation to racks where the boxes are stored closely.

It is a further considerable inconvenience of this rack that the hooks of the arms are fragile because of their required cooperation with the standard recesses in the box, and that the covers or boxes, as stated, are produced from a very fragile material.

More recently EP 1 143 843 discloses a storage and display device for a plurality of vertically arranged flat box-shaped items, which device has a supporting structure constituted by an extruded metal blank having a vertical rigid back, a relatively smooth and plane, essentially horizontal, lower supporting face integrated with said back for the lower edges of the box-shaped items, and an upper horizontal retaining member integrated with said back and extending in the lateral direction and carrying a rubber-elastic member under its lower surface and extending in the lateral direction for engagement with the upper edges of the box-shaped items inserted into the device.

The plane and smooth supporting face permits the boxes to swing around an essentially vertical axis even though their weight essentially rests on the supporting face. The insertion and removal of a box is essentially facilitated as the lower, inner corner of the box may slide in place even after the rubber-elastic member of the retaining means has obtained a braking engagement with the upper inner corner of the box.

The rigid back behind the supporting face acts as a stop securing fastening of a box in a definite position. As the box is mainly retained by its two inner corners (which are in front in the insertion direction), the gravity will make it swing around a horizontal axis in the lateral direction of the rack.

This corresponds to an inward force acting at the lower stop adjacent to the supporting device, and this force is absorbed by the stop. At the same time it is assured that all the boxes are aligned to each other, whereby a favourable visual impression is obtained.

The supporting surface and the rubber member extend relatively shortly from the front side of the back, preferably about 10 and 5 mm, respectively.

This allows leafing in a plurality of boxes as the axis of rotation in the swinging leafing movement will be correspondingly close to the rear edge of the box. This provides the user with a convenient access to watch the fronts of the boxes where the most relevant and most easily recognisable information is frequently found.

The rubber-elastic member of the retaining member may comprise an edge or lip facing the articles, which lip points in the direction towards the stop of the retaining means, i.e. backwards towards the front side of the rack.

By an edge or lip engaging the upper edge of the box, a reduced insertion force and a better retaining are obtained due to the resiliency of the edge or lip. This resiliency gives per se a lesser resistance when inserting the box in the rack. During insertion in the rack, the resiliency of the edge or lip means that the rubber-elastic edge abutting against the upper edge of a box is deformed instead of slipping when the box is subjected to stress for removal. The rubber edge thus maintains a better "grip" in the upper edge of a box.

However this prior art device has the drawback that it is only capable of to accommodate one type of flat boxes of a particular vertical size, e.g. covers for CDs, MDs, DVDs or BLU-RAYs. Once it is produced it can only be used for such one type of such covers, and it cannot be changed to any other type of covers having a different vertical dimension, neither by the manufacturer nor by the user. This is rather impractical for both the manufacturer and the users and hence there is a need for a storing device which can easily be changed to accommodate any of the common standard covers or cassettes for CDs, MDs, DVDs and BLU-RAYs.

OBJECT AND SUMMARY OF THE INVENTION

The object of the invention is to provide a holder or rack for flat box-shaped articles, which is free from the above disadvantages of the known racks and which permits a close storage of the boxes and to leaf through the boxes as in a book and which can easily be changed to accommodate any of the common standard covers or cassettes for CDs, MDs, DVDs and BLU-RAYs and others.

This object is obtained according to the invention by the holder or rack for storing and displaying a plurality of flat box-shaped articles defined in the accompanying claim 1.

This holder or rack is suitable as a display and/or disposal place for the articles not only at private homes, but also at dealers and in libraries or the like.

Preferred embodiments of the holder or rack according to the invention are defined in the accompanying dependent claims.

The upper and or lower beams can on their front projections have holders such as open canals to hold signs, labels or the like. Thus, it is obtained that e.g. an alphabetical grouping of the boxes does not occupy sideways place between the boxes. These may be arranged sideways close and still be grouped in a systematic way.

According to the invention, the rack preferably has suspension means, which can engage with fittings to be fastened on a wall.

A further object of the invention is to permit the rack to be suspended plumb very precisely in a simple way. This is achieved in that the rack below on the rear side has adjustable abutting means for support against a wall on which the rack is suspended. The supporting means may have the form of pieces from an extruded rubber item, which have longitudinal weakenings in the crosswise direction to permit a crosscutting of the supporting means, if desired.

Finally, it is an object of the invention to permit a number of holders to be suspended below each others in a simple and secure way. This is easily obtained by interconnecting three or more beams by means of further adjustable spacer members locked to the beams in series below each others'.

Since the holder or rack may be composed of a few identical main components, viz. beams, spacer members and elongated rubber-elastic members, which all can be extruded as elongated blanks, an extremely simple, rational and low-cost production of the holder or rack is obtained providing a pleasant appearance of the holder or rack in combination with a simple and cheap ornamental front sheet placed between the beams.

BRIEF DESCRIPTION OF THE DRAWINGS

The invention will be further explained in more detail below by means of examples of embodiments and with reference to the accompanying drawings, in which:

FIG. 7 is a cross sectional view of a beam suspended on a wall fixture or mounting member, FIG. 8a, b is a cross sectional view and front view, respectively, of the wall fixture or mounting member shown in FIG. 7, FIG. 9 is a cross sectional view of a beam provided with a rubber-elastic member in its front projection and an adjustable abutment member in each rear side projection, and FIG. 10a, b, c are side views and end view (c), respectively, of the abutment member shown in FIG. 9.

In the following identical reference numbers are used for corresponding parts in all the Figures.

DETAILED DESCRIPTION OF PREFERRED EMBODIMENTS OF THE INVENTION

Figure 1:
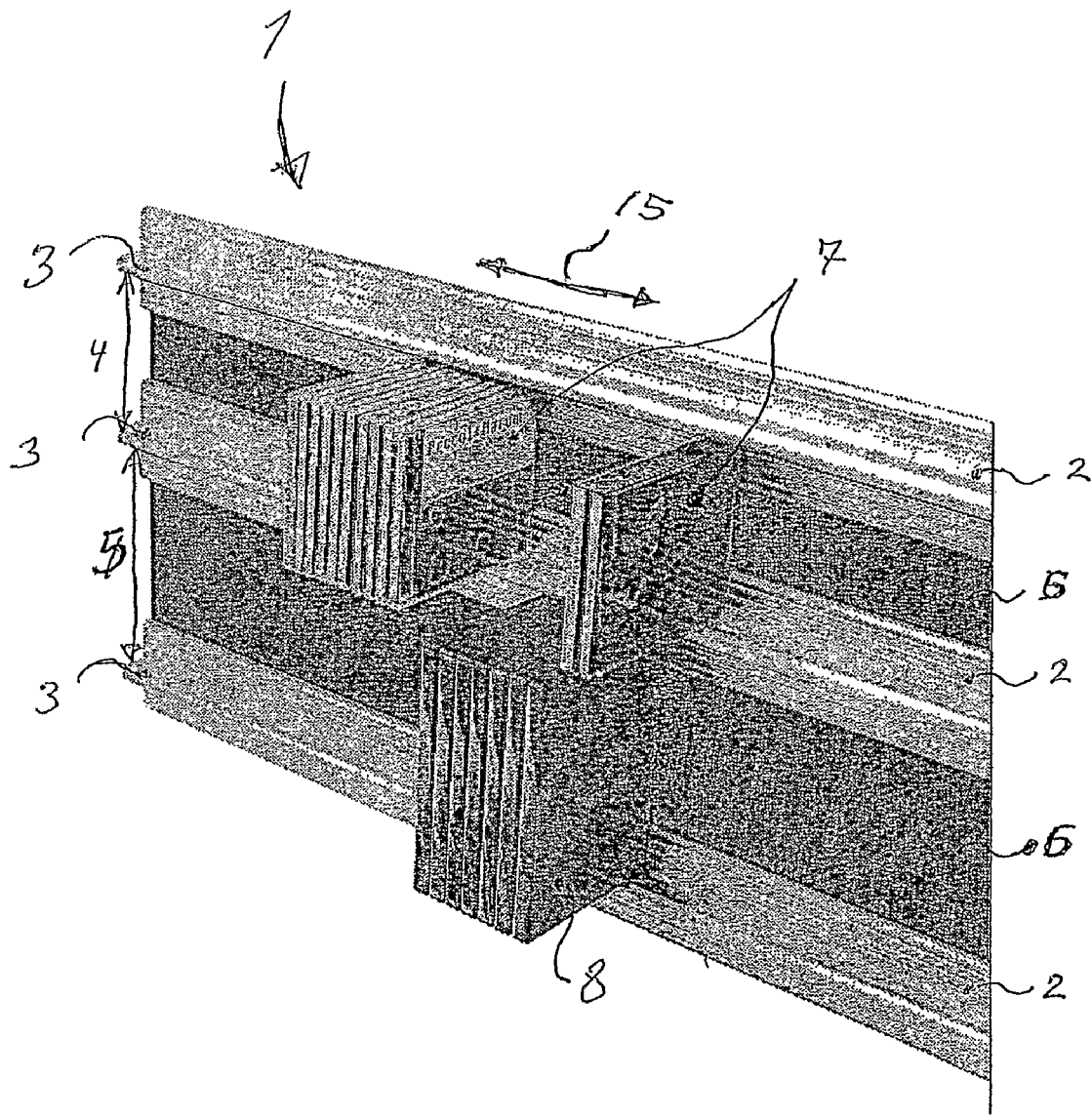
FIG. 1 is a perspective view of a holder or rack according to the invention comprising three mutual parallel and laterally extending rigid beams spaced above each others' and suspended by a wall fixture on a wall.

FIG. 1 shows a holder or rack 1 according to the invention. The holder comprises three mutual parallel and laterally extending rigid beams 2 spaced above each others' in the vertical direction. Each beam has on its front side a substantially horizontal and laterally extending projection 3, each pair of which defines a vertical gap 4, 5 between adjacent upper and lower projections. The gap 4 is smaller than the gap 5. Covers or cassettes 7 for e.g. CDs are inserted and retained in the gap 4 and covers or cassettes 8 for e.g. DVDs are inserted and retained in the gap 5. Ornamental sheets, foils or plates 5 are mounted in the gaps 4, 5 between adjacent beams 2. Such sheets, foils or plates may be made of plastic, cardboard, millboard, pasteboard or metal and metal alloys and they may optionally be corrugated or concertina folded so as to be extendable in the vertical direction. They may also be provided with pictures, signs and other decorations. The arrow 15 indicates the lateral direction of the holder or rack according to the invention.

Figure 2:
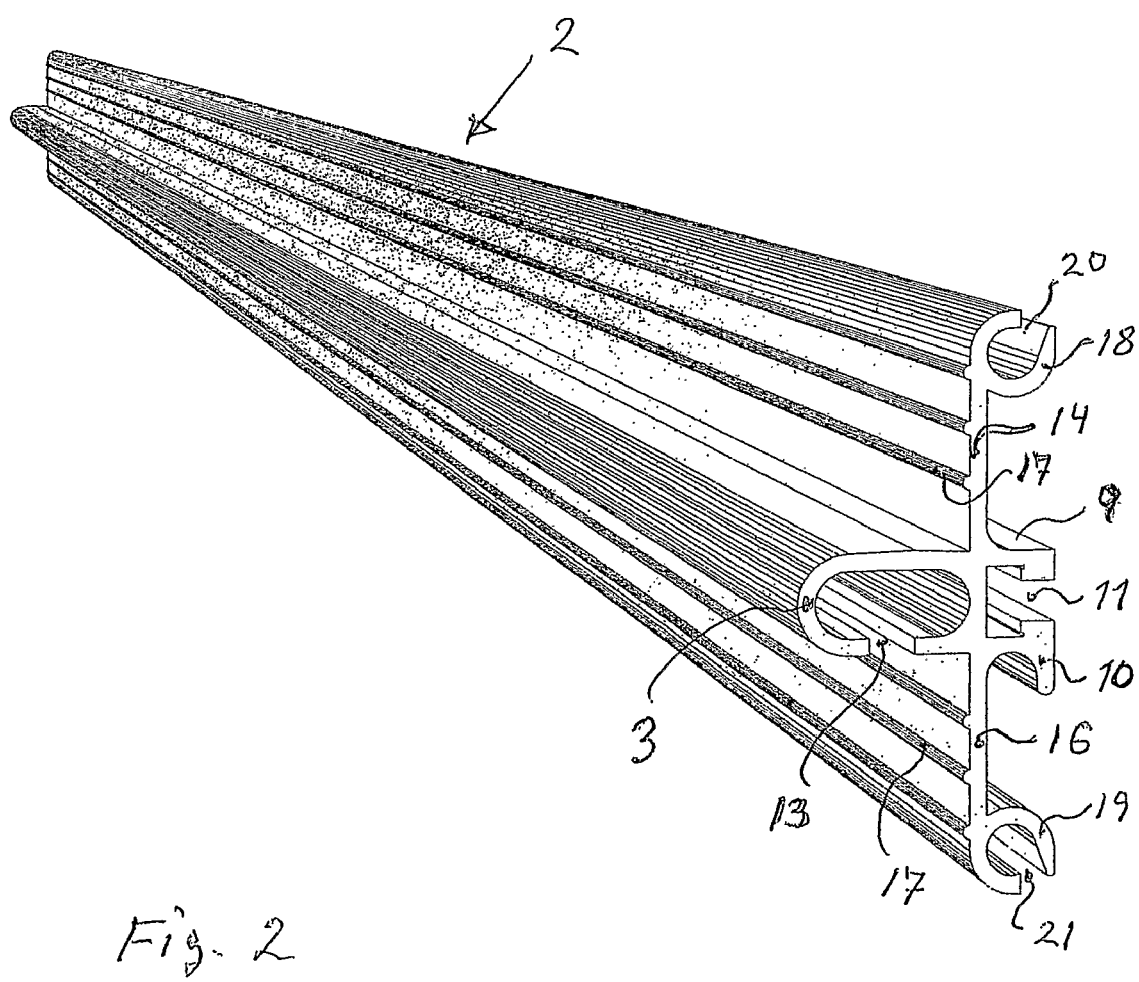
FIG. 2 is a perspective view of one of the three laterally extending beams in FIG. 1, showing one end in cross section.

FIG. 2 shows a laterally extending rigid beam 2 having a substantial horizontal and laterally extending projection 3 on its front side and a laterally extending horizontal projection 9 on its rear side. The front side projection 3 has the form of a hollow oblong cylinder, the top surface of which is substantially smooth and planar and defines a support ledge for a lower corner or edge of a vertically oriented flat box-shaped article inserted into the holder. The underside of the front projection 3 is provided with a laterally extending slot 13 forming with the void volume of the hollow oblong cylinder a groove adapted to receive and retain an elongated rubber-elastic member.

The laterally extending rear projection 9 has a laterally extending undercut groove 11 adapted to receive and retain the head of one or more screws or bolts (not shown) at selected positions. The underside 10 of the rear projection 9 is curved so as to be hook-shaped in cross section forming a suspension member for the holder or rack.

The beam 2 has an upward extending flange portion 14 and a downward extending flange portion 16. Both the upper and lower flange portions are provided with laterally extending beads 17, the purpose of which is partly ornamental, but they may also serve as abutment stops for the articles placed in the holder.

Both the upper and lower flange portions 14, 16 terminates at their upper and lower, respectively, edges in hollow laterally extending cylinders 18, 19, each of which is provided with laterally extending slots 20, 21 forming with the hollow cylinders 18, 19 laterally extending grooves or channels adapted to receive and retain upper and lower edges of an ornamental sheet 5, 6.

Figure 3A:
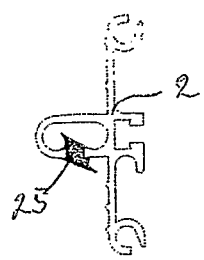
FIG. 3 is a side view of a holder or rack according to the invention comprising four laterally extending beams shown in cross section, FIG. 3a, b, c are cross sectional views of three of the four beams shown in FIG. 3.
Figure 3B:
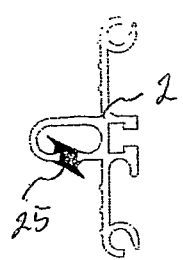
Figure 3C:
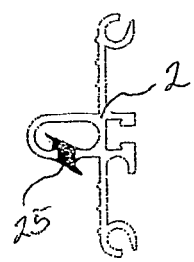
Figure 3:
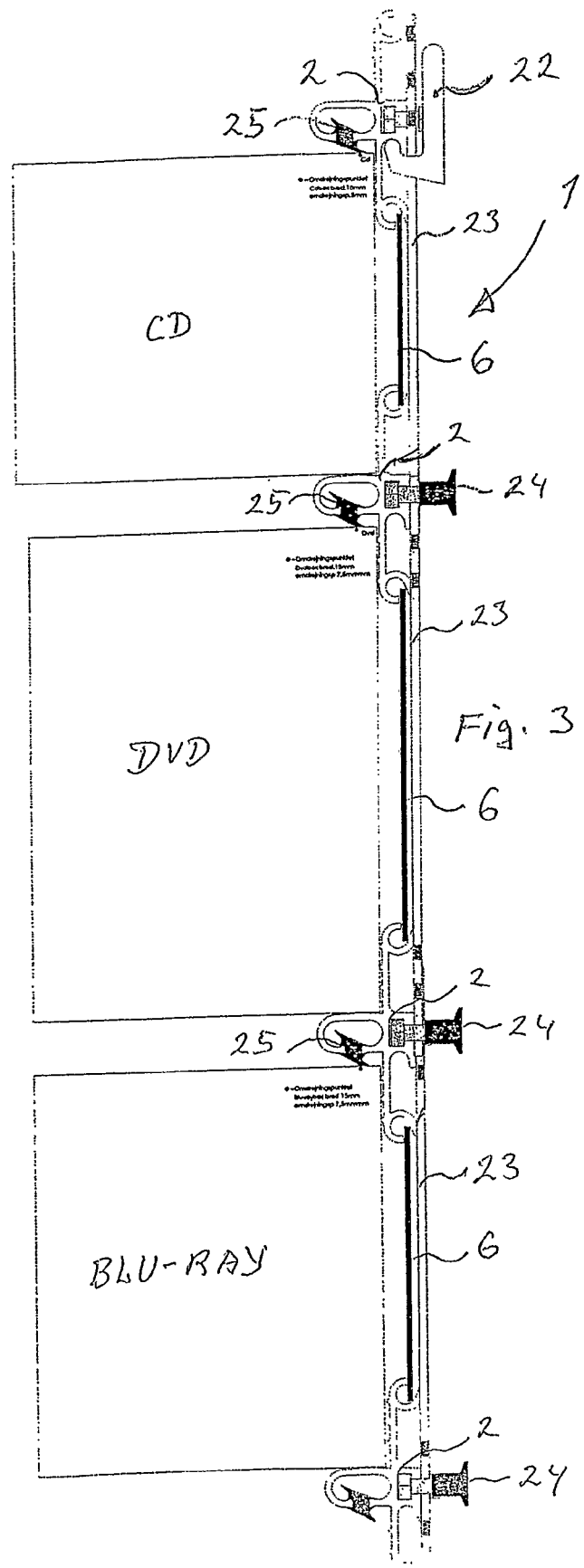

FIG. 3 shows a side view partly in section of a holder or rack 1 according to the invention. The holder is suspended on a wall fixture or mounting member 22, which is in engagement with the suspension member of the uppermost beam. The holder comprises in total four beams 2 defining together three gaps of different vertical sizes adapted for e.g. CD, DVD and BLU-RAY covers or cassettes as indicated. The flat covers or cassettes are maintained in the gaps by the barb or grip action of the wedge-shaped lip portions of elongated rubber-elastic members 25. The rubber-elastic members 25 are shown in greater details in FIG. 3a, b, c. Rigid spacer members 23 connect the beams 2 in a fixed, but adjustable vertical relationship. The solid lines 6 indicate ornamental sheets, foils or plates as explained for FIG. 1, covering and hiding the spacer members 23 as seen from the front of the holder or rack. The reference numeral 24 indicates adjustable abutment members to support against a wall surface, which may be uneven and not plumb, so that the total holder or rack can be suspended completely vertically.

Figure 4A:
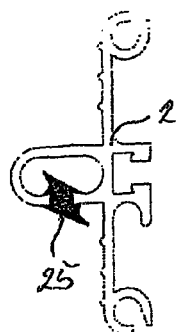
FIG. 4 is a side view of the holder in FIG. 3, but in an enlarged scale, FIG. 4a, b, c are cross sectional views corresponding to FIG. 3a, b, c, but shown in enlarged scale.
Figure 4B:
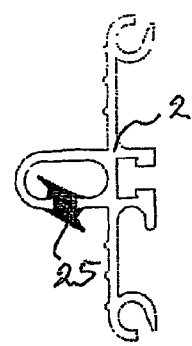
Figure 4:
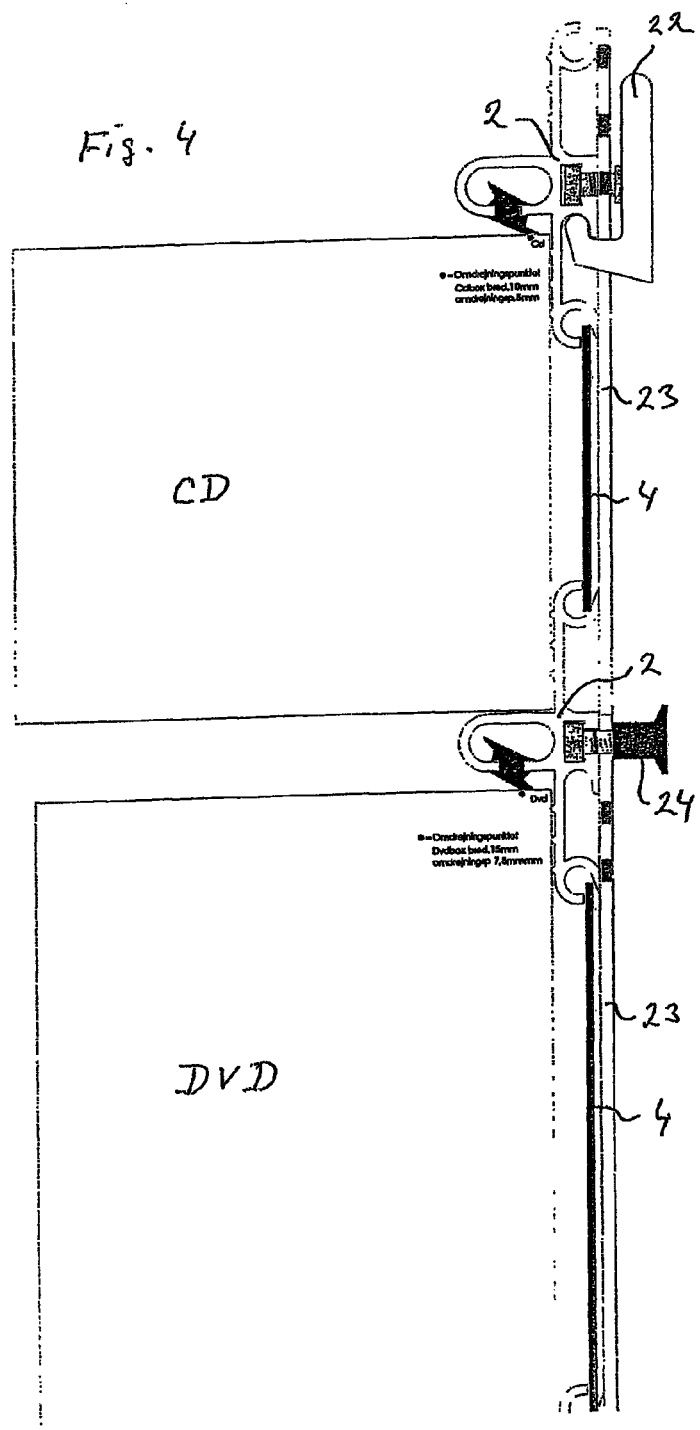
Figure 4C:
Figure 4:
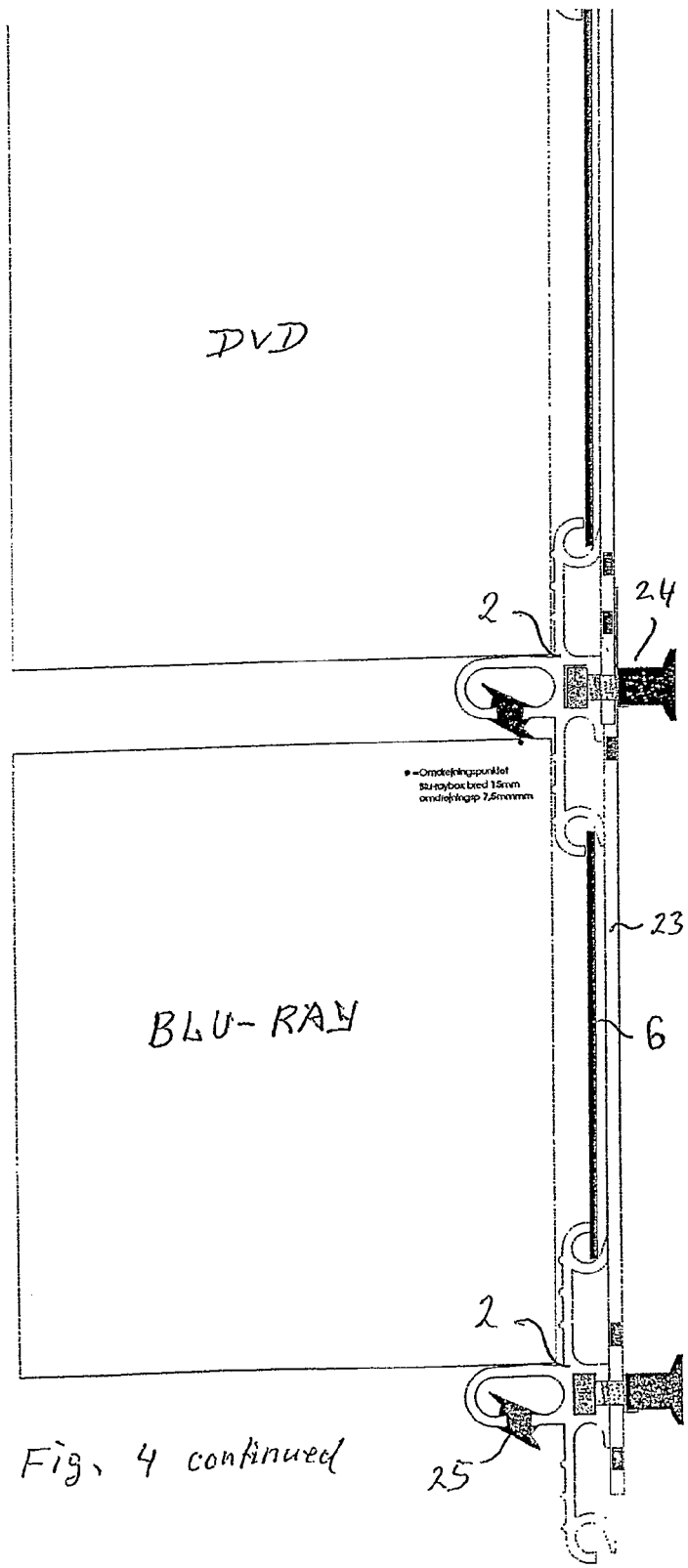

FIG. 4 is an enlarged view of the holder shown in FIG. 3. The reference numerals shown have the same meanings as explained for FIG. 3. It is indicated that the upper center of rotation for a CD-box, which has a width (thickness) of about 10 mm, is about 5 mm from the front side of the lower flange of the upper beam, whereas the upper center of rotation for a DVD-box or a BLU-RAY box, which have widths (thicknesses) of about 15 mm, is approximately 7.5 mm from the front side of the lower flanges of the lower beams in the gaps adapted to receive DVD or BLU-RAY boxes. This is obtained by using an elongated rubber-elastic member having two opposite wedge-shaped lip portions, one of which is longer than the other and has an oblique inclination toward the front side of the beams when inserted into the laterally extending groove in the front side projection of the other beam, whereas the opposite lip portion is shorter and directed substantially vertically downward in its free not engaged position. The longer lip portion is used for a gap intended for CD boxes, whereas the shorter lip portion is used for gaps intended for DVD and BLU-RAY boxes.

Figure 5:
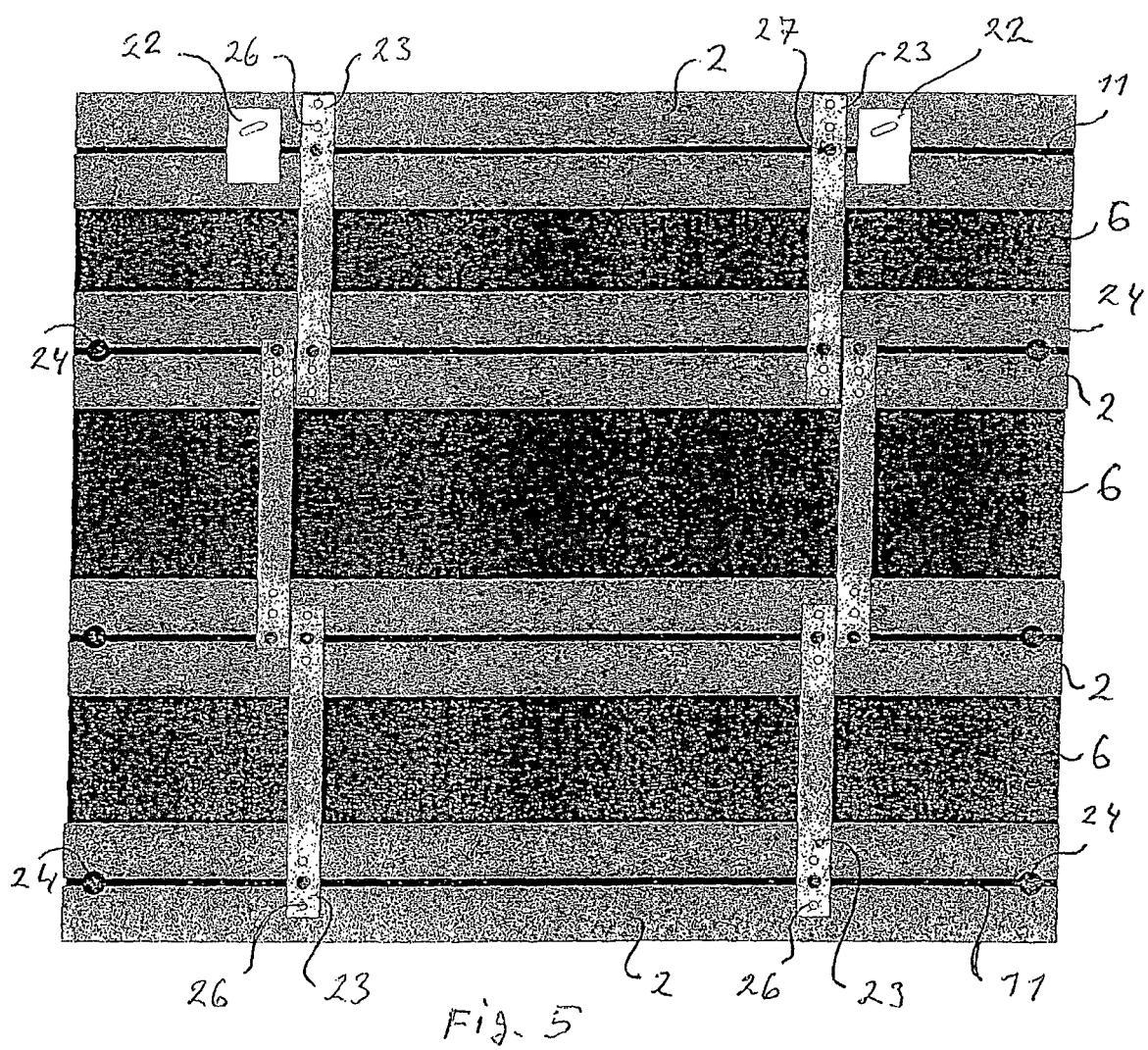
FIG. 5 is a rear view of the holder or rack according to the invention shown in FIGS. 3 and 4.

FIG. 5 is a rear view of the rack shown in FIGS. 3 and 4. The rack comprises four beams 2 fixed in a parallel horizontal arrangement by rigid spacer members 23. Each spacer member 23 is at both its ends provided with three bores at 26, 27 adapted to be penetrated by the shaft of a screw or bolt and secured by a nut 27. The heads of such screws or bolts are introduced into the laterally extending undercut grooves provided in the rear side projections of the beams 2. It is seen that such three bores at each end of a spacer member allows a gap between two neighbouring beams to be adjusted to six different distances without any part of a spacer member will protrude beyond the upper or lower edge of any beam. The upper most beam is suspended on a wall fixture 22 which is to be secured to a wall by screws or bolts or the like. 24 Indicates adjustable abutment members to support against a wall surface so that the total holder or rack can be suspended completely vertically. The heads of these abutment members are introduced into the groove 11 as shown in more detail in FIGS. 3 and 4.

Figure 6:
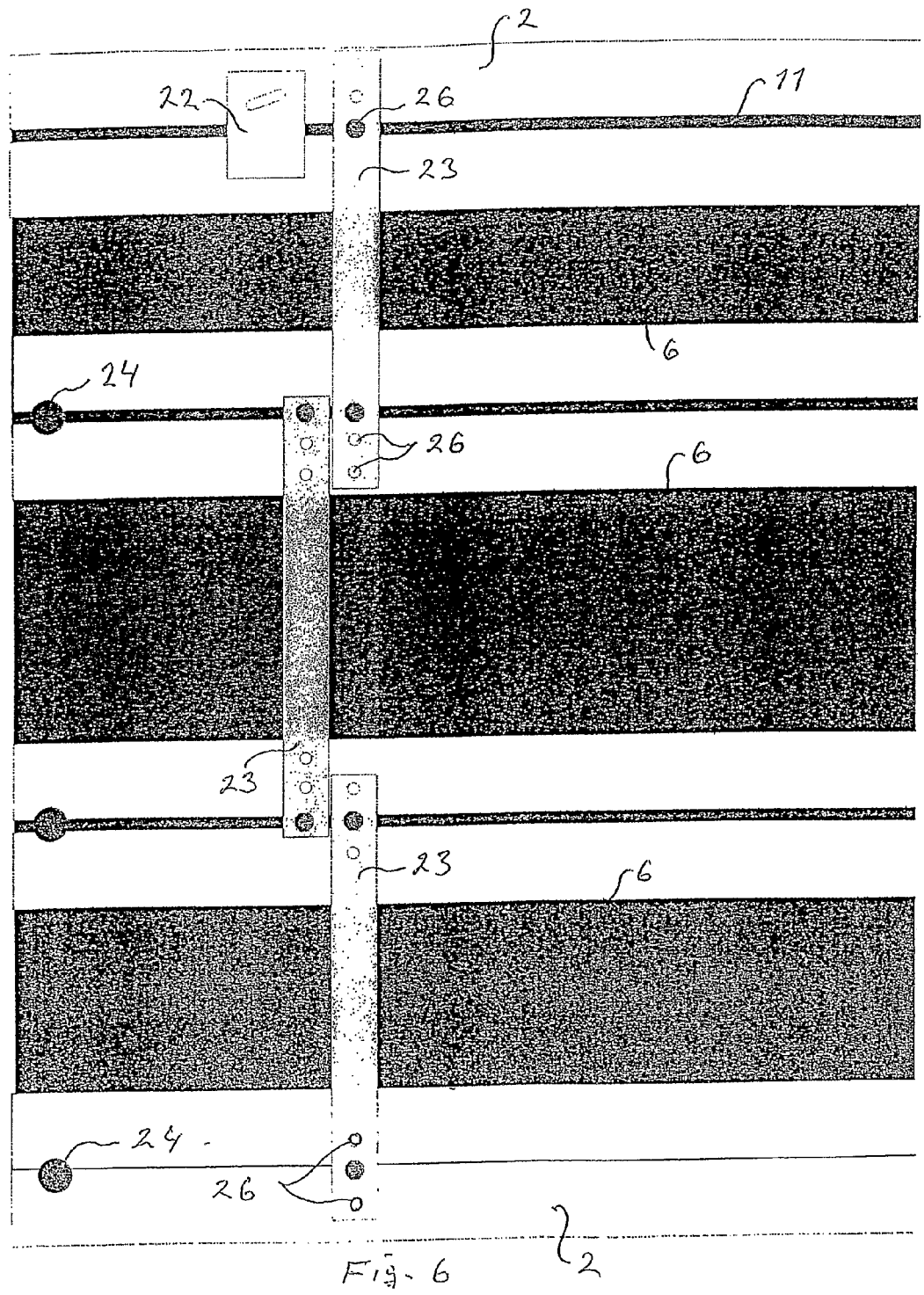
FIG. 6 is a rear view of the holder or rack shown in FIG. 5, but in an enlarged scale.

FIG. 6 is a rear view of a part of the holder or rack shown in FIG. 5, but in an enlarged scale. The reference numerals indicated has the same meaning as explained for FIG. 5.

FIG. 7 shows in cross section a beam 2 suspended on a wall fixture or mounting member 22. Also shown is a double-lip rubber-elastic member 25 introduced into a slot on the under side of the hollow front projection 3 of the beam. Laterally extending beads 17 are provided on the front side of both the upper and lower flanges 14, 16 of the beam 2.

FIG. 8 a, b shows in cross section and plan view, respectively, the wall fixture of mounting member 22. 28 is an inclined slot for introducing the shaft of a screw or bolt by which the mounting member is to be secured to a wall surface. The inclined slot makes it possible to adjust the level of the mounting member after a hole has been bored into a wall and screw or bolt has been introduced into the slot but not yet firmly fixed to the wall.

FIG. 9 shows a cross section of the beam shown in FIG. 7, but here provided with an adjustable abutment member 24 screwed onto a bolt the head of which is introduced and retained in the undercut groove 11 in the projection 9 on the rear side of the beam 2.

FIG. 10 a, b, c shows the abutment member 24, partly from the side (a, b) and partly from the end (c). In a and b the abutment member is threaded unto a bolt 30. The abutment member may be made of plastic, metal or other suitable material.

Even though the description only mentions the use of the rack according to the invention for storage and display of boxes, there is nothing to prevent the invention from being used for other objects of the same flat box-shaped form. The only requirement is that the objects are equally large in one of their two largest dimensions, typically the height.

Such other objects can e.g. be packed goods in flat boxes, books or booklets tightly wrapped in plastic foil. The use for solid objects, which are to be removed and put in place frequently, such as serving trays, is also possible.

The invention claimed is:

1. A holder or rack (1) for storing and displaying a plurality of flat box-shaped articles (7, 8), in a substantially vertical and mutual parallel arrangement, said holder or rack comprising at least an upper rigid beam and at least one lower rigid beam, said upper rigid beam and said at least one lower rigid beams extending mutual parallel in a lateral direction spaced from each other in a vertical direction by at least one rigid spacer member, the upper rigid beam having a downward extending flange portion providing an upper abutment stop for the articles and the at least one lower rigid beam having an upward extending flange portion providing a lower abutment stop for the articles, each of said beams having on a front side thereof, a substantially horizontal and laterally extending projection defining a vertical gap between the projection on the upper rigid beam and the projection on the at least one lower rigid beam, at least the horizontal projection on the at least one lower rigid beam having a substantially smooth and planar horizontal top surface defining a support ledge for a lower corner of a vertically oriented flat box-shaped article and at least the horizontal projection on the upper rigid beam having an underside provided with a laterally extending groove configured to receive and retain an elongated rubber-elastic member having, in cross section, a wedge-shaped lip portion projecting substantially vertical downwards from the underside of said upper horizontal projection when inserted and retained in said groove so as to form a grip or barb retaining an upper corner of a vertically oriented flat box-shaped article pushed into the gap defined between the horizontal projections on the upper rigid beam and the at least one lower rigid beam, wherein said at least one rigid spacer member is provided with means for adjusting the vertical distance between the horizontal projections on the upper rigid beam and the at least one lower rigid beam so as to adapt the gap between said upper and lower projections to a particular vertical size corresponding to a vertical size of the plurality of flat box-shaped articles to be stored in said holder or rack.

2. A holder or rack according to claim 1, wherein said at least one rigid spacer member is provided at the rear side of the upper rigid beam and the at least one lower rigid beam.

3. A holder or rack according to claim 1, wherein each of the upper rigid beam and the at least one lower beam is provided with means for receiving and retaining the head of at least one screw or bolt and said at least one rigid spacer member is provided with at least one vertically arranged row of bores comprising at least three bores vertically spaced at specified selected distances corresponding to a desired size of the gap between the horizontal projections on the upper rigid beam and the at least one lower rigid beam.

4. A holder or rack according to claim 3, wherein said means for receiving and retaining the head of at least one screw or bolt is provided on the rear side of each of the upper rigid beam and the at least one lower rigid beam.

5. A holder or rack according to claim 3, wherein each row of bores comprises at least four bores vertically spaced at specified selected distances so that the gap between the horizontal projections on the upper rigid beam and the at least one lower rigid beam can be adjusted to receive flat box-shaped articles of at least three different vertical sizes.

6. A holder or rack according to claim 1, wherein each of the upper rigid beam and the at least one lower rigid beam is provided with means for receiving and retaining the heads of at least two laterally spaced screws or bolts and that said at least one rigid spacer member is provided with at least one vertically arranged row of bores comprising at least three bores vertically spaced at specific selected distances corresponding to a desired size of the gap between the horizontal projections on the upper rigid beam and the at least one lower rigid beam.

7. A holder or rack according to claim 1, wherein each of the upper rigid beam and the at least one lower rigid beam is provided with means for receiving and retaining the heads of at least two laterally spaced screws or bolts and that said at least one rigid spacer member is provided with at least two laterally spaced, vertically arranged rows of bores, each row comprising at least three bores vertically spaced at specific selected distances corresponding to a desired size of the gap between the horizontal projections on the upper rigid beam and the at least one lower rigid beam.

8. A holder or rack according to claim 1, wherein each of the upper rigid beam and the at least one lower rigid beam is provided with a laterally extending horizontal projection on a rear side thereof, said projection being provided with a laterally extending undercut groove for receiving and retaining the head of one or more screws or bolts at selected positions corresponding to the positions of the rows of bores in the spacer member into which the shafts of the screws or bolts are to be introduced and fixed by a nut.

9. A holder or rack according to claim 8, wherein the underside of said rear side projection is hook-shaped in cross section so as to form a downward facing groove forming a suspension basis for the holder or rack, to be engaged with an opposite facing hook-shaped mounting member fixed onto a wall.

10. A holder or rack according to claim 1, wherein a lower flange edge of the upper rigid beam comprises a laterally extending groove or channel for receiving and retaining an upper edge of an ornamental sheet, foil or plate and an upper flange edge of the at least one lower rigid beam comprises a laterally extending groove or channel for receiving and retaining a lower edge of said ornamental sheet, foil or plate so that said sheet, foil or plate covers and hides portions of the at least one spacer member which are not covered and hidden by the upper rigid and at least one lower rigid beams.

11. A holder or rack according to claim 1, wherein each of the upper rigid beam and the at least one lower rigid beam is of identical shape or form and, thus, are interchangeable.

12. A holder or rack according to claim 1, wherein each of the upper rigid beam and the at least one lower rigid beam has both upper and lower vertically extending flanges provided with laterally extending beads forming stops for upper and lower edge portions of the plurality of flat box-shaped articles pushed into the gap between the horizontal front projections of the upper rigid beam and the at least one lower rigid beam.

13. A holder or rack according to claim 1, wherein said elongated rubber-elastic member has two opposite wedge-shaped lip portions, one of the opposite wedge-shaped lip portions is longer than another one of the opposite wedge-shaped lip portions and has an oblique inclination toward the front side of the beams when inserted into the laterally extending groove in the front side projection of the upper rigid beam, whereas the shorter lip is directed substantially vertically downward.

14. A holder or rack according to claim 13, wherein the front side projection on each of the upper rigid beam and the at least one lower rigid beam is a hollow oblong cylinder capable of accommodating the non-protruding portion of the rubber-elastic member.

15. A holder or rack according to claim 1, wherein an innermost portion of the upper surface of the front side projection on at least the lower rigid beam is slightly inclined downward.

16. A holder or rack according to claim 1, wherein the upper rigid beam and the at least one lower rigid beam comprises at least three mutual parallel laterally extending rigid beams spaced above each other, and having front side horizontal projections, wherein at least two vertical gaps are defined between the front side horizontal projections of the at least three mutual parallel laterally extending rigid beams.

17. A holder or rack according to claim 1, further comprising at least two rigid spacer members spaced apart in the lateral direction, each of said members is in a form of a rod, a rail, a bar, a flat or profiled plate, having an angled, T-shaped or U-shaped form.

18. A holder or rack according to claim 1, wherein the upper rigid beam and the at least one lower rigid beam are produced from an extruded elongate metal blank, selected from the materials of aluminium or an aluminium alloy.

* * * * *